June 21, 1960 C. W. PILO ET AL 2,941,872

APPARATUS FOR INTIMATE CONTACTING OF TWO FLUID MEDIA HAVING DIFFERENT SPECIFIC WEIGHT

Filed June 9, 1959

5 Sheets-Sheet 1

CLAES WILHELM PILO and

SVEN WILHELM DAHLBECK

INVENTORS

BY Cushman, Darby & Cushman

ATTORNEYS

June 21, 1960 C. W. PILO ET AL 2,941,872

APPARATUS FOR INTIMATE CONTACTING OF TWO FLUID MEDIA HAVING DIFFERENT SPECIFIC WEIGHT

Filed June 9, 1959 5 Sheets-Sheet 2

CLAES WILHELM PILO and

SVEN WILHELM DAHLBECK

INVENTORS

BY Cushman, Darby & Cushman

ATTORNEYS

INVENTORS
CLAES WILHELM PILO and
SVEN WILHELM DAHLBECK
BY Cushman, Darby & Cushman
ATTORNEYS CLAES WILHELM PILO and
SVEN WILHELM DAHLBECK
INVENTORS
BY Cushman, Darby + Cushman
ATTORNEYS June 21, 1960 C. W. PILO ET AL 2,941,872

APPARATUS FOR INTIMATE CONTACTING OF TWO FLUID MEDIA HAVING DIFFERENT SPECIFIC WEIGHT

Filed June 9, 1959 5 Sheets-Sheet 5

CLAES WILHELM PILO
and
SVEN WILHELM DAHLBECK
INVENTORS.
BY Albert M. Parker
ATTORNEY.

United States Patent Office 2,941,872
Patented June 21, 1960

2,941,872

APPARATUS FOR INTIMATE CONTACTING OF TWO FLUID MEDIA HAVING DIFFERENT SPECIFIC WEIGHT

Claes Wilhelm Pilo, Stockholm, and Sven Wilhelm Dahlbeck, Djursholm, Sweden; said Dahlbeck assignor to said Pilo Filed June 9, 1959, Ser. No. 819,191

26 Claims. (Cl. 23—270.5)

This invention relates to apparatus for producing counter current contact between two fluids having different specific gravity for treatment of one or the other thereof in various manners. Either, or both, of the fluids may be subjected to the desired treatment and the fluids may both be liquids, or the lighter thereof may be a gas. Non limiting examples of treatments in accordance with the invention are those commonly known as scrubbing and direct heat exchanging.

This application is a continuation in part of our application Serial No. 439,096, filed June 24, 1954, now abandoned.

If two liquids of different specific gravity are treated, the lighter liquid is conducted in the same manner as a gas or vapour. For the sake of simplicity, however, only the treatment of a liquid with gas and vice versa is described in the following.

The processes and apparatus hitherto used with gas scrubbers, distillation apparatus and heat exchangers are essentially based on the fact of producing a large surface of contact per unit of volume between the media. However, it has been shown that the surface of contact is of only limited importance, but it is also of essential importance for a good scrubbing, distilling or heat transferring capacity that the conditions are such that the gas is able to convey the scrubber substance or the heat quantity to be transferred quickly to the contact surface between the gas and the liquid. The same also applies as regards the liquid.

Though in some instances the conveying capacity of flowing media will be advantageously influenced if turbulence occurs, it has also been found that in other instances it is not necessary to arrange for turbulence in either the gas or the liquid. Instead, satisfactory conveying for quick transferral can be brought about with laminary flow even of the gas. This latter has the advantage of low losses of pressure.

The apparatus of the invention is effective for treatments as indicated whether turbulence of one or the other of the fluids is created, but due to its particular countercurrent action good results are obtainable even with laminary flow of gas, due to the narrow passageways for the fluids.

When using screening members and bubble caps, the counter-current principle is only insufficiently fulfilled. The use of filler bodies only permits a slight turbulence, if any, of the liquid.

Apparatus of the prior art used for effecting treatments of the type for which the invention apparatus is intended are large and bulky and have to be operated at low gas velocity. If they were operated at a high gas velocity, the gas would catch droplets of the liquid, carry them from some distance in countercurrent to the flow of liquid and disturb the intended relationship between the gas and the liquid. In the invention construction on the contrary, the gas employed can flow at a high velocity without disturbing that relationship.

Effectiveness is achieved in accordance with the invention by carrying out a nearly ideal countercurrent washing, or other process, in relatively narrow passageways. This is made possible due to the fact that the flow of liquid is subjected to relatively great centrifugal forces so that great velocity of the gas flow may be permitted without any danger of liquid droplets being entrained by the gas. This process may be carried out also in narrow passageways grace to the great centrifugal forces, and the use of narrow passages makes it possible to carry out the process under ideal countercurrent conditions so that the countercurrent process can be well developed.

Though the apparatus of the invention enables operation with gas velocities much greater than heretofore contemplated, highly effective results can also be achieved without too great velocity of gas. Hence, a velocity other than the most effective one for the particular treatment may be employed while still producing greatly improved results over those of the prior art.

The process and apparatus according to the invention consists essentially in that the specifically heavier liquid medium is conducted centrifugally over rotating fixed boundary surfaces in thin layers produced by centrifugal action and the specifically lighter medium is conducted in a turbulent or laminary flow centripetally over the said liquid layers.

The novel process may be carried into effect in a particularly expedient manner by means of apparatus which operates with an annular rotating body, in which the media come into contact with one another and which is subdivided by fixed walls into substantially radially extending passages. The apparatus according to the invention is so constructed that the walls of the passages preferably are made of a material which can be wetted by the specifically heavier liquid and arranged in such manner that this liquid supplied to the inside periphery and flowing towards the outer periphery merely covers the walls with a thin layer, so that the passage cross section remains free for the travel of the lighter medium supplied at the outer periphery of the body of revolution and withdrawn at the inner periphery.

The result obtained by the invention, especially when centrifugal forces are allowed to be set up which amount to a multiple of the acceleration due to gravity, is that considerable relative velocities of the media relatively to one another are obtained. It is thus readily possible to increase the gas velocity, since the danger of the liquid layer being entrained practically no longer exists, quite in contrast to the known scrubber devices.

The thickness of the liquid film is to be considerably smaller than the average spacing between adjoining wall surfaces, but this spacing is also kept comparatively small in order to produce intensive contact between the gas and liquid and a well developed countercurrent effect, whether through turbulence or merely through laminar flow. In this manner, there are also obtained very short times of contact, which is particularly advantageous for certain purposes.

When using the invention, a particularly intensive exchange of material or heat is obtained between the two phases, when the heavier phase (liquid) is under the action of a centrifugal force amounting to a multiple of the acceleration due to gravity, while at the same time the length of stay of the gas between the wall surfaces does not exceed 6 seconds and frequently is considerably less than 1 second.

Already, when the liquid on the wall surfaces is subjected to a centrifugal force corresponding to about 10 times the acceleration due to gravity, there are obtained according to the invention considerably improved results as compared with the previously known processes. It may be mentioned, by way of example, that when using the process according to the invention for the removal of benzene from town gas by scrubbing with mineral oil and with a speed of rotation of the distributor surfaces which produces a minimum centrifugal value of 13 times the acceleration due to gravity, there has been obtained a scrubbing capacity per unit of volume which is forty times as great as when using scrubbing towers of the usual type. The drop in pressure in the gas is then only ¼ of the pressure drop in the known scrubbing tower, so that the advantages produced by means of the invention are considerable. Moreover it is possible to manage with smaller quantities of liquid.

According to the purpose of use, the operation will be carried out with centrifugal forces which are 15 to 200 times greater than the acceleration due to gravity. By means of suitably shaped wall surfaces, it is possible in certain cases to distribute the liquid over the wall surfaces in very thin layers of 0.1–0.01 mm. or less. The length of the path of flow in the interstices is usually flat least 50 times and often several hundred times as large as the average spacing between the wall surfaces. This spacing may for example be of the order of size of 1 to 3 mm. Even when the centrifugal force is only 10–15 or 25 times the acceleration due to gravity, at least on some parts of the distribution surfaces, there are nevertheless produced such good results that it is possible in many cases, for practical reasons, to be satisfied with these comparatively low centrifugal force values.

With the apparatus according to the invention, the means by which the specifically heavier liquid is delivered to the rotating body may be constructed in various ways. The means may be so constructed that no excessive atomization of the delivered liquid takes place. It has now been found that it is important in certain circumstances, for the uniform distribution of the heavier medium on the wall surfaces of the rotating body in thin layers, to supply the liquid at least partially in the form of fine drops to the rotating body or to the wall surfaces. Due to the preliminary fine distribution of the liquid which has already taken place owing to the specific construction of the distributor means, it has been found that the liquid is spread out in a particularly uniform manner on the fixed wall surfaces, whereby the intended effect is substantially improved in certain cases.

If the distributor means is constructed for the purpose above described, however, it is not possible in practice to prevent some of the finely divided liquid from being entrained by the lighter medium issuing at the inner periphery and being discharged from the treatment device according to the invention, which is hereinafter referred to briefly as a scrubber. In order to recover the heavier liquid which is discharged from the scrubber in this manner, a separator device is provided after the scrubber (seen in the direction of flow of the lighter medium), the entrained heavier medium being separated from the lighter medium in the said separator. When the lighter medium is a gas, the separator may take the form of a cyclone or any suitable means which are suitable for separating drops from a gas. If the lighter medium is a liquid, separators will then be used in known manner for this purpose which effect a separation of liquids which differ from one another as regards their specific gravity.

The heavier liquid separated in the separator from the gas or the lighter liquid is then advantageously returned to the scrubber again for the purpose of treating additional quantities of the lighter medium.

The process according to the invention may also be further improved in another respect. It may be expedient for constructional and operational reasons for the material and/or heat exchange between the media supplied to the rotating scrubber not be carried out in one stage, but to be spread over several stages, each stage consisting of a rotating scrubber operating according to the basic principle of the invention, it being possible for the separate scrubbers in many cases to be made with smaller dimensions than when operating in only a single stage. The sub-division of a rotating scrubber operating in a single stage into two or more separate scrubbers may also be used according to the invention in order to remove different constituents to a different extent from the media, or to exchange such media. For this purpose, the separate stages will have supplied to them media, the composition or chemical properties of which may be different as compared with the starting media with the single-stage method of operation. In this manner, it is, for example, possible for ammonia and hydrogen sulphide to be successively scrubbed with water and ammonia water, respectively, and benzene hydrocarbons to be washed out with benzene wash oil from the crude coke oven gas in successive stages operating in accordance with the basic principle of the invention.

For the removal of certain constituents, more especially from the lighter medium, it may be expedient for the separate stages as regards the direction of movement of the lighter medium, for example, of the gas, to be connected in a certain sequence, but in a different sequence as regards the heavier medium, it also being possible for the stages to be assembled in pairs or groups and in parallel or series connection. It is also possible for the media to be conducted wholly or partially several times through the same stage or group of stages. The counter-current principle according to the main working principle of the invention obviously obtains inside the stages themselves, independently of the connection of the stages to one another.

The last mentioned working method may be used in a particularly advantageous manner, for example, for the so-called selective scrubbing of hydrogen sulphide and ammonia, for example from coke oven gas, with water and/or $NH_3$ liquid. By selective scrubbing of hydrogen sulphide and ammonia from coke oven gas, there is understood a scrubbing process with which the smallest possible quantity of carbon dioxide, but the largest possible amount of hydrogen sulphide and ammonia, are removed from the gas by the scrubbing medium (water and/or ammonia water). It is already known that for this purpose a short period of contact between coke oven gas and scrubbing medium is appropriate in each case, because only then is it possible to keep the formation of ammonium carbonate (from $CO_2$ and $NH_3$) small as compared with the formation of ammonium bisulphide (from $H_2S$ and $NH_3$). The primary aim was formerly to shorten the contact times, but it was overlooked that the problem of the selective scrubbing of hydrogen sulphide is not solved by shortening the time of contact, because it is also necessary to bear in mind very different dissolution velocities of hydrogen sulphide and ammonia. The first contact of the crude gas with the scrubbing medium already removes such a quantity of ammonia from the gas that as the scrubbing process continues, there are no sufficiently large ammonia concentrations in the gas and scrubbing medium for the complete conversion of the $H_2S$ into ammonium sulphide The known introduction of supplementary ammonia into the further scrubbing process, however, only serves any purpose and is only effective if the concentrated scrubbing solution is not removed only on conclusion of the scrubbing process, but is already removed beforehand from the process, preferably at a point at which the concentration of the ammonia in the scrubbing solution or gas is at a minimum. In this case, it is possible to remove practically all of the $H_2S$ or the major part thereof as ammonium sulphide from the gas. The return of ammonia water to a more advanced stage of the scrubbing process or the extraction of the water richer in ammonium sulphide in a middle stage of the process is to be solved in a particularly simple manner by means of the arrangement according to the invention, because the said arrangement at the same time also permits a very short time of contact. For this purpose, three rotating scrubbers are provided which may perhaps be arranged on the same axis inside the same housing. It is obviously also possible to provide the three rotating scrubbers in separate housings with separate drive means. If the three scrubbing stages are referred to as I, II and III, the coke oven gas to be treated flows through the three stages in the sequence I, II and III. The scrubbing liquid, which is fresh water in this case, is initially supplied to stage III and in this stage, substantially washes out the residual ammonia quantities remaining in the gas which has already been treated in the stages I and II. From stage III, the scrubbing water with a small ammonia content, after water rich in ammonia has been fed to it from the discharge of stage I, passes into the scrubbing stage II. In addition to the discharge from the scrubbing stage I, or also instead of said discharge, it is also possible for other water containing ammonia, for example, the condensate from the gas cooler, to be fed to scrubbing stage II. After the hydrogen sulphide has been substantially removed from the gas, for the major part in the form of ammonium sulphide which dissolves in the scrubbing water, the said sulphide being removed in stage II with the aid of this water which is comparatively rich in ammonia, one part of the scrubbing liquid is removed from the process after stage II, while the other part of the scrubbing liquid is supplied to stage I in order to wash out the essential part of the ammonia from the crude gas supplied to this stage. The flow of scrubbing medium tapped after the second stage from the process, and also the possible flow of scrubbing medium which is withdrawn from the first stage and which contains a considerable quantity of ammonia, are so dimensioned in their ratio to one another and in their total quantity that the hydrogen sulphide is removed from the gas as far as possible in the form of ammonium sulphide.

In order to obtain the least possible percentage of $H_2S$ in the scrubbing liquid entering stage I the process may be carried out in such a manner that the scrubbing liquid leaving stage III is supplied to stage I directly and subsequently, after having passed through this stage and thus containing much $NH_3$ and comparatively little $H_2S$, is supplied to stage II. In this case it may, in certain cases, be suitable not to supply any scrubbing liquid from stage II to stage III but instead to withdraw from the process the whole quantity of liquid arriving from stage II.

It may also be possible in certain cases for the gas to have gaseous ammonia added to it before entering the second stage in order thereby to improve the scrubbing of the hydrogen sulphide in the second stage.

Although the process of the selective scrubbing of $H_2S$ and $NH_3$ from coke oven gas as just described may be carried out in a particularly advantageous manner by means of apparatus according to the invention, it is also possible to use partially or entirely different exchange means, if it is possible to restrain the in itself undesirable scrubbing of carbon dioxide with known or other means.

From the foregoing it will be seen that no matter what the nature of the flow of the countercurrent fluids may be, effective treatment or exchange is achieved. If turbulent flow is desired, the conditions of operation can be set to achieve it. On the other hand, the nature of the apparatus with its narrow passageways is such that highly effective results are similarly attainable with laminar flow of both gas or liquid, so operation of the apparatus in that manner is equally within the purview of the invention. No matter what the nature of the flow may be, the fact remains that with apparatus of unusually small size compared to the prior art very high transfer is effected in terms of mass transfer units or heat transfer units.

It is accordingly the principal object of the invention to improve upon the treatment of a fluid of one specific gravity by a fluid of another.

Another object is to provide apparatus in which such treatment can be carried out.

Another object is to provide such apparatus which is materially reduced in size compared to apparatus of the prior art.

Another object is to provide apparatus in which such treatment can be effectively carried out, employing various types of flow of the fluids.

Still another object is to provide apparatus for effecting such treatment in more economical and effective manner than heretofore contemplated.

A more specific object is to provide for high speed countercurrent flow between such fluids.

A further object is to provide thin uniform layers of the fluids being treated in such counter current flow.

A more specific object is to utilize the effects of centrifugal and centripetal forces for achieving high speed countercurrent flow of the fluids.

Further and more detailed objects of the invention will in part be obvious and in part be pointed out as the description of the invention taken in conjunction with the accompanying drawing proceeds.

Figure 1:
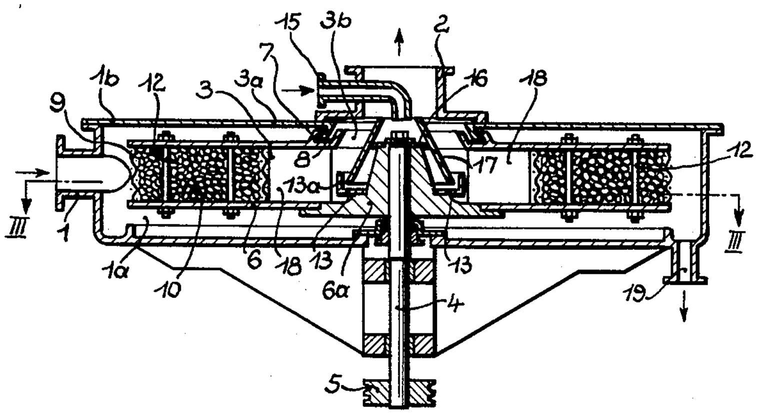
Fig. 1 is a vertical section through one embodiment of the invention.
Figure 2:
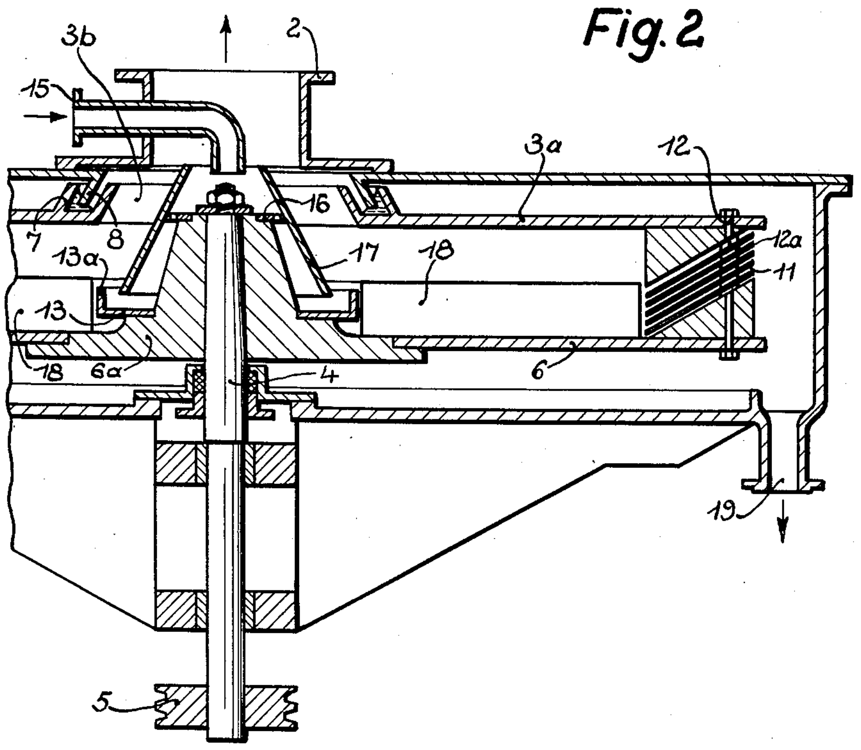
Fig. 2 is a fragmentary section to a larger scale through another important embodiment thereof.

In the embodiments of Figs. 1 and 2, the gas enters a chamber 1a in a mainly cylindrical housing 1b through an inlet pipe 1 which is for example tangentially disposed. The gas leaves the chamber through a discharge pipe 2. The chamber 1a contains a rotor 3 which is substantially in the form of a cylindrical ring, provided with an upper annular cover and a lower annular base. The base 6 of said rotor is fixed by means of a boss 6a on a spindle 4, which may be set in rotation, for example, by means of a belt pulley 5. An intermediate chamber 3b, which is in communication with the gas outlet 2, is disposed between the cover 3a of the housing 1b, which is preferably not perforated, and the middle part of the chamber 1a.

Figure 3:
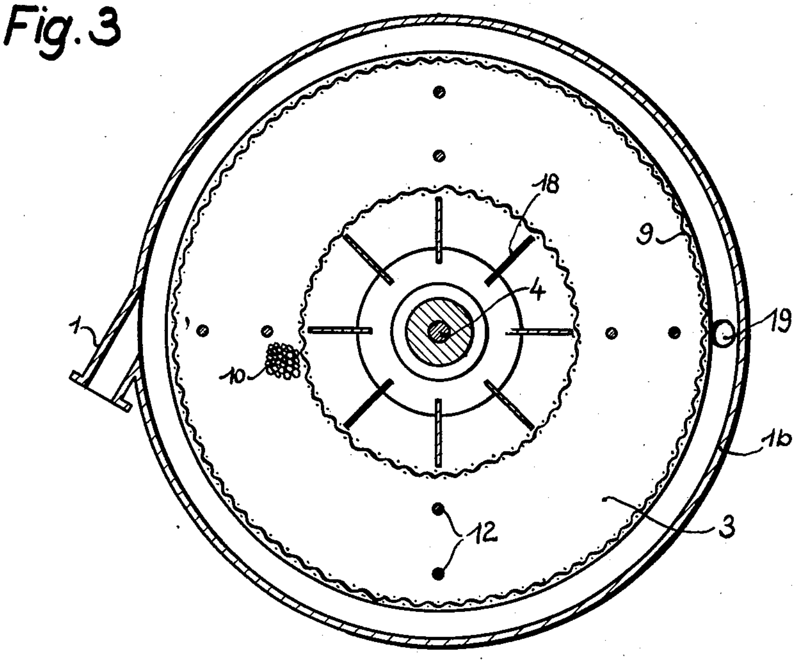
Fig. 3 is a horizontal section on the line III—III of Fig. 1.
Figure 4:
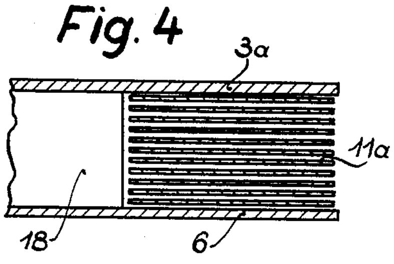
Figs. 4–11 represent diagrammatically further and different embodiments of the distribution surfaces.

In the Fig. 1 form a band of considerable radial extent within the rotor and around the outer part thereof is formed by filler bodies of size, shape and material suitable for enabling counterflow of the fluids to be effected while providing substantial contact areas between them. In this instance the rotor has a peripheral casing wall 9 for retaining the filler bodies which wall may consist, for example, of metal wire fabric or grids. The base and cover of the rotor are held together in spaced relation by bolts 12 (see Figs. 1 and 3).

By reference to Fig. 1 it will be seen that the filler bodies 10 may advantageously be replaced by a number of annular overlying plates 11 of sheet metal and the like. These plates may be parallel, or substantially parallel. They are arranged closely adjacent to one another forming a bundle held together by the bolts and the spacers 12a.

Moreover, the plates may be of very different constructions. A number of examples are shown diagrammatically in Figs. 4 to 11. The plates according to Fig.

2 are inclined in relation to a plane at right angles to the spindle 4. This inclination may be varied between 0° and 90° of an angle with respect to that plane. The plates 11*a* according to Fig. 4, however, are parallel to such plane.

Figure 5:
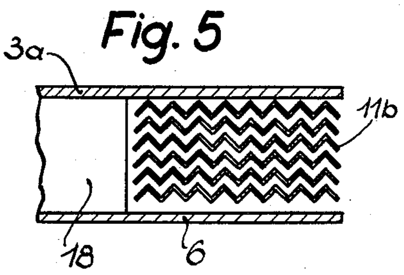

According to Fig. 5, the plates 11*b* are corrugated in zig-zag form with respect to the plane at right angles to the spindle and form between them narrow passages which are of zig-zag form. These plates may also be inclined as in accordance with Fig. 2.

Instead of arranging annular plates according to Figs. 2 to 5 they can also be arranged in a circular row as shown in Figs. 6 to 11.

Figure 6:
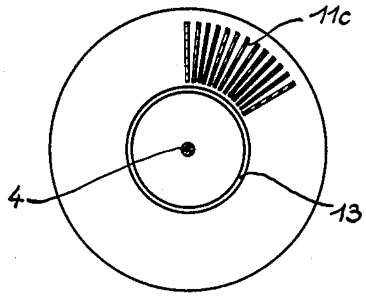
Figure 7:
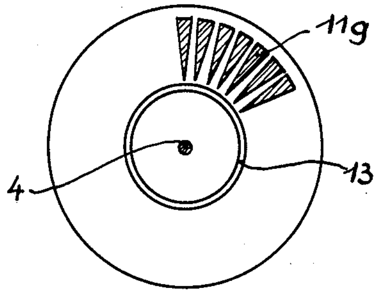

Fig. 6 show plates 11*c* which extend mainly at right angles with respect to the plane at right angles to the spindle and lie in planes which are radial with respect to the spindle 4. In the case where the plates are at right angles, or substantially at right angles, the plates may expediently be made thicker towards the periphery so that the spaces between the plates are not larger at the outer end than nearer to the centre. Since the centrifugal force is greater in the vicinity of the periphery, it may even be expedient, as shown diagrammatically at 11*g* in Fig. 7, for the plates to be made so thick towards the periphery that the spaces are narrower at this end than towards the centre.

Figure 8:
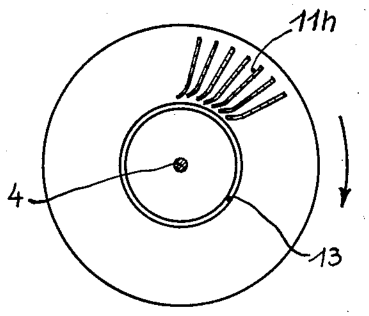

In many cases, it may be advantageous for the plates to be made curved or bent. By way of example, Fig. 8 shows a rotor with a vertical axis and vertical plates 11*h* onto which the liquid is directly distributed by a rotating shell 13. The liquid is distributed onto the plates at the inner ends thereof in a horizontal plane disposed substantially midway of the height thereof. The surfaces 11*h* are almost radial towards their outer periphery or form a moderate angle in relation to the radial plane, but nearer the centre they have a form which is more strongly curved towards the direction of rotation, so that the direction of the centrifugal force at this point forms such a large angle to the surface that the liquid is quickly distributed over the entire surface.

Figure 9:
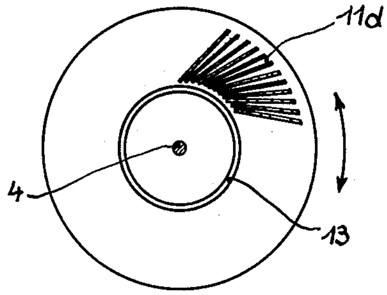
Figure 10:
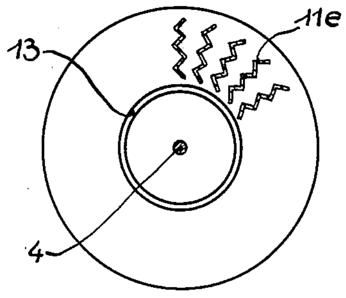
Figure 11:
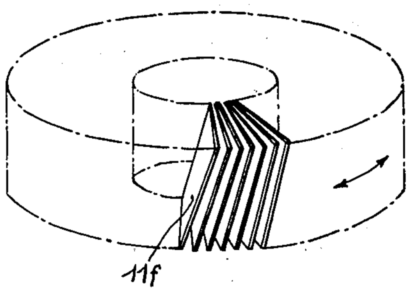
Figure 12:
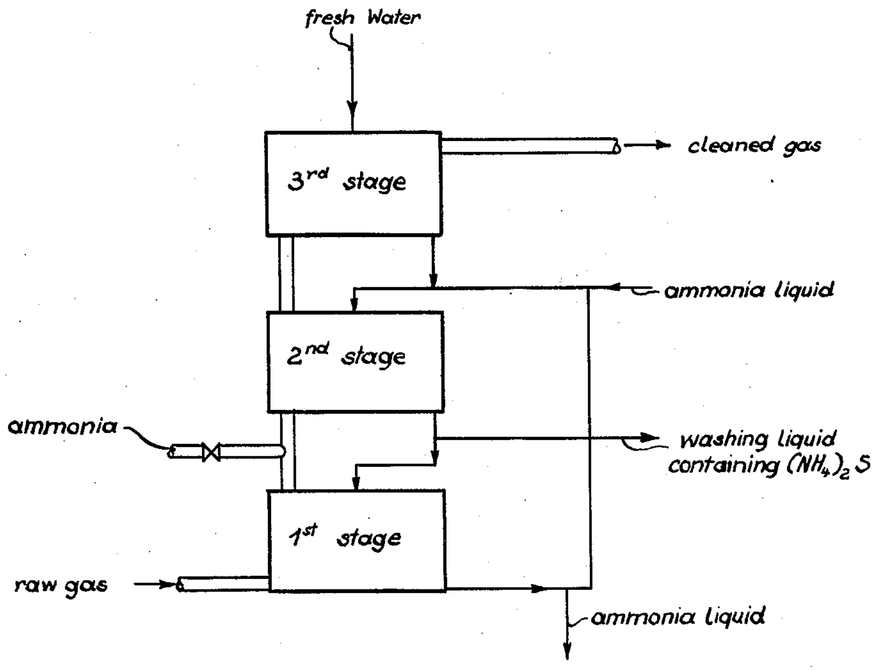
Fig. 12 shows diagrammatically an arrangement for scrubbing hydrogen sulphide and ammonia from coke oven gas.

According to Fig. 9, the plates 11*d* extend perpendicularly like the plates 11*c*, but lie in planes forming chords with respect to the periphery of the rotor. Fig. 10 shows an embodiment having corrugated blades 11*e*, which extend substantially perpendicularly. It is also possible for the blades according to Figs. 2, 7, 8, 9 and 11 to be corrugated in this manner. Fig. 11 shows that the plates 11*f* may be inclined to the vertical plane, and they may then either extend radially, as according to Figs. 6 and 7, or along the chord planes according to Fig. 9. With the corrugated construction, it is also possible for each blade to consist of a plurality of parts extending at an angle to one another. When the surfaces extend substantially parallel to the plane of rotation of the rotor, as in accordance with Figs. 2, 4, and 5, it may be expedient, for example, by bulges (projections) in the plates, to facilitate the acceleration of the liquid with respect to the speed of rotation of the plates. These projections also contribute to fixing the mutual spacing of the plates.

Whether filler bodies as in Fig. 1, or any of the spaced plate arrangements of Figs. 2–11 be employed to provide passageways for the countercurrent flow of the fluids, one important factor is present throughout. That is that the passageways provided are narrow. This, taken in conjunction with the forces acting to move the fluids in countercurrent therethrough, accounts for the high effectiveness achieved by the invention.

In order that the arrangement may operate satisfactorily, it is of importance that all the gases and vapours which are supplied definitely flow through the filler bodies or layer of plates as the case may be. It is therefore necessary to produce a reliable rotary seal connection (as best seen in Fig. 2), between the stationary housing 1*b* and the rotor. For this purpose, an annular duct or channel 7 may with advantage be arranged bordering the intermediate space 3*b* on the upper side of the cover 3*a* of the rotor, said channel forming a liquid seal by the fact that an annular wall portion 8 of the housing 1*b* projects into the channel 7 which is partially filled with liquid. In order to prevent the liquid being thrown outwardly, the walls of the channel 7 and also the wall portion 8 are inclined relatively to the axis of rotation of the rotor 3. The angle may, for example, be 30–90°, or the walls of channels 7 and the wall portions 8 may be bent. The blocking effect of the revolving liquid seal 7, 8 must be at least as large as, or somewhat larger than, the pressure drop of the gas through the filler bodies or bundle of plates. Other suitable sealing arrangements may, of course, be employed here if desired.

In the embodiments of Figs. 1 and 2, the supply of the liquid to the rotating surfaces may, for example, be effected in the following manner; fixed to the boss or hub 6*a* of the rotor is a trough or dished member 13 with an upwardly directed rim 13*a*. The liquid is supplied through a fixed tube 15 and runs on to a perforated plate 16, by which it is distributed inside a conical screen member 17 and thereafter flows downwardly into the trough 13. Due to the rotation of the trough the liquid is projected outwardly over the rim 13*a* and collected by a number of substantially radially extending plates 18 which extend approximately parallel to the axis of rotation. The liquid is flowed radially outwardly on these plates in thin perpendicular layers with the height of the layers increasing towards the outer extremities of the plates. At the same time the tangential speed of movement of the layers is accelerated to approximately the velocity of the filler body layer 10 or of the plates 11 whichever is employed. The result obtained by this arrangement is that the liquid, immediately upon entering the layers of filler bodies or arriving on the plates, is distributed throughout the entire height of these elements at several points of the periphery.

The plates 18 do not have to lie in radial planes extending through the axis of the rotor, but may also be more or less inclined relatively to this plane, for example, in order completely or partially to canel out the action of gravity on the liquid. The plates also do not have to be radial, but may extend at an angle to the radii. The number of the plates 18 is usually fewer than that of the plates 11. In most cases, however, there are expediently provided more plates 18 than are shown diagrammatically in the drawing. More especially when using vertical plates 11 the plates 18 are provided with a suitable distributing device on the edges thereof facing the periphery, so that all the plates 11 are wetted uniformly, or the plates 18 are dispensed with and instead the diameter of the trough 13 is enlarged, so that the rim 13*a* extends as far as the distributing surfaces. This construction is shown generally in Figs. 6–11 and in more detail in Fig. 13.

Figure 13:
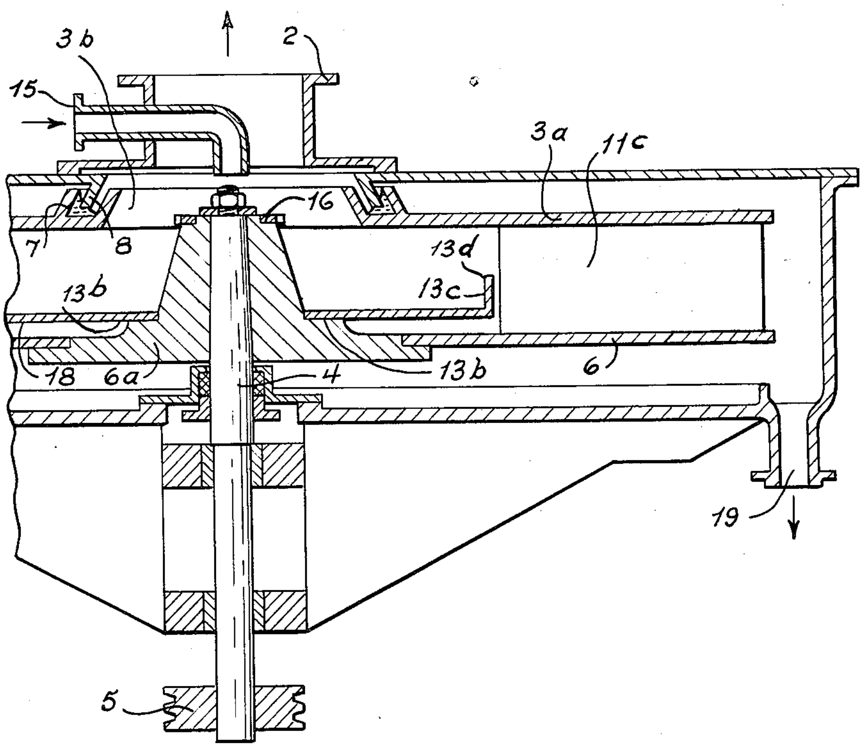
Fig. 13 is a view similar to Fig. 2 of embodiment in accordance with Fig. 6.

In Fig. 13 the trough has a base 13*b* which extends out radially to a greater extent than is shown in Figs. 1 and 2. It terminates in an upstanding lip 13*c* whose upper end 13*d* lies midway between the plates 3*a* and 6 or slightly above midway. At the same time, and as in keeping with the showing in Fig. 6, the plates 11*c* are of greater radial extent than the plates 11 of Fig. 2. With the upper free end 13*d* of the lip at substantially the midpoint of the height of the plates, it will be apparent that as the rotor turns the liquid distributed onto the plates 11*c* will spread throughout the full height thereof.

It is of certain importance that the surfaces of the fillers and plates are so adapted from case to case, as regards the properties of the liquid, or the liquid is so selected or treated that these surfaces are effectively wetted by the liquid under the conditions prevailing in the scrubber. Sometimes it is possible to arrange the distributor not along the entire periphery of the row of plates 11 but only at a single place or a few places on the inner periphery. The plates 11 may per se consist of any suitable material, provided that it is wetted by the liquid.

Though the trough 13 fixed to rotate with the rest of the rotor has been shown as the sole type of device for initiating distribution of the heavier fluid, other suitable arrangements may be employed. For one, a trough generally similar in construction and position to the trough 13 may be driven at a different, usually higher, speed of rotation than that of the rotor and in the same or in reverse direction to the direction of rotation of the rotor. On the other hand, nonrotative distributors may be employed consisting for example of vertical pipes formed with a plurality of apertures or a vertical narrow slot therein and arranged inside the inner periphery of the annular body. From one to four pipes would be sufficient. If separate shafts are arranged for rotating the distributor 13 and the annular fluid contact body or rotor, such shafts may extend through the stationary casing of the apparatus from the same direction and the shafts are then arranged coaxially one within the other, or from opposite directions; in the latter case suitable sealing means is arranged between the distributor and the rotor, when the axis of the distributor passes into the casing from below.

The distributor is adapted to spread the liquid along the entire inner periphery and the axial height of the annular rotor.

The invention may be used for gas scrubbers, distillation apparatus and heat exchangers, but also for the reactions between gas and liquid, liquid and liquid, and so on. The arrangement may also be modified in various ways within the scope of the invention.

We claim:

1. Apparatus for the countercurrent contact of two fluids having different specific gravities, which comprises, a stationary rotor housing forming an enclosed fluid compartment, a rotor mounted within said compartment for rotation about a central longitudinal axis, said rotor comprising a pair of radially extending walls in axially spaced relationship defining annular fluid distribution and fluid contact chambers therebetween concentrically disposed with respect to said central axis, said fluid contact chamber being disposed about the periphery of said fluid distribution chamber, one of said walls being formed with an outlet therethrough substantially concentric with respect to the axis of said rotor, said outlet communicating with said distribution chamber, sealing means surrounding said outlet and disposed between said housing and said one wall for preventing communication between said distribution chamber and the adjacent portion of said compartment, fluid introducing means for the introduction of the heavier of the two fluids communicating with said distribution chamber adjacent said rotor axis, means for distributing said heavier fluid from said introducing means outwardly through said distribution chamber in the direction of said fluid contact chamber and narrow passage forming means positioned in said fluid contact chamber and extending from said distribution chamber to the periphery of said rotor, said passage means providing fluid contact means for receiving the outwardly distributed heavier fluid, discharge outlet means formed in said rotor housing for removing said heavier fluid after it has been peripherally discharged from said contact chamber, inlet means formed in the wall of said housing for peripherally supplying a lighter fluid to said contact chamber and outlet means formed in said housing adjacent the central axial outlet of said distribution chamber for removing the lighter fluid from said apparatus and means for rotating said rotor body to move the heavier fluid centrifugally in countercurrent to the lighter fluid moving centripetally throughout said contact chamber.

2. Apparatus as in claim 1, said distributor means including plate means mounted within said distribution chamber for rotation therewithin.

3. Apparatus as in claim 2, said plate means mounted for rotation at the same r.p.m. as that of said rotor.

4. Apparatus as in claim 2, said plate means mounted for rotation at an r.p.m. different from the r.p.m. of said rotor.

5. Apparatus as in claim 2, said plate means mounted for rotation in reverse direction from that of said rotor.

6. Apparatus as in claim 1, said distribution means including baffle means positioned within said distribution chamber between said introducing means and said contact means.

7. Apparatus as in claim 6, said baffle means including spaced plates extending substantially transversely with respect to the walls of said rotor.

8. Apparatus as in claim 1, said narrow passage forming means including filler bodies mounted within said contact chamber.

9. Apparatus as in claim 1, said narrow passage forming means including a plurality of plates in closely spaced relationship extending between said distribution chamber and the periphery of said rotor.

10. Apparatus as in claim 9, said plates being annular and mounted one above the other.

11. Apparatus as in claim 10, said annular plates extending in spaced radial planes substantially at right angles to the axis of the rotor.

12. Apparatus as in claim 10, said annular plates extending at an angle with respect to radial planes at right angles with respect to the axis of the rotor.

13. Apparatus as in claim 10, said annular plates being corrugated transversely, with respect to the direction of flow of the fluids.

14. Apparatus as in claim 9, said plates being arranged in at least one circular row around the axis of the rotor.

15. Apparatus as in claim 14, said plates lying in radially extending axially elongated planes with respect to the axis of the rotor.

16. Apparatus as in claim 14, said plates being wedge shaped in cross section with the apices of the wedges extending towards the axis of the rotor and with the plane bisecting the angles of such apices lying in radially extending axially elongated planes with respect to the axis of the rotor.

17. Apparatus as in claim 16, the sides of opposed ones of said wedge shaped plates converging in the radially outward direction to form passages of diminishing width therebetween.

18. Apparatus as in claim 14, said plates having the major portions thereof lying in radially extending axially elongated planes with respect to the axis of the rotor and having minor portions thereof turned at an angle with respect to said major portions.

19. Apparatus as in claim 14, said plates are included in chords of a circle having its center on the axis of the rotor.

20. Apparatus as in claim 14, said plates extending generally radially and being corrugated transversely, with respect to the direction of flow of the fluids.

21. Apparatus as in claim 14, said plates lying in planes inclined with respect to radially extending axially elongated planes with respect to the axis of the rotor.

22. Apparatus as in claim 2, said plate means formed with an upstanding lip therearound to provide a trough member for the distribution of the heavier fluid thereover.

23. Apparatus as in claim 22, said trough member distributing said liquid onto baffle plates extending between said trough member and said passage forming means.

24. Apparatus as in claim 22, said trough member extending throughout said distribution chamber and said lip distributing said heavier liquid directly onto said passage forming means.

25. Apparatus for the countercurrent contact of two fluids having different specific gravities, which comprises a stationary rotor housing forming an enclosed fluid compartment, a rotor body rotatably mounted within said compartment for movement about a longitudinal central axis, said rotor body comprising a pair of transversely extending outer walls which are longitudinally spaced from one another to define an annular fluid contact chamber therebetween in coaxial alignment with said central axis, one of said outer walls having a central axial outlet in communication with said contact chamber, fluid sealing means disposed between said housing and the outer wall of said rotor body adjacent said central axial outlet, a rotary fluid distributor comprising a fluid barrier, and a fluid distributing trough coaxially disposed within the central axial region of said contact chamber, said fluid barrier being in the form of a conduit having a fluid inlet portion extending coaxially through said central axial outlet and a fluid outlet portion opening centrally into said contact chamber, said fluid distributing trough being disposed within said contact chamber axially below said fluid barrier with a peripheral outer edge which extends slightly above the outlet portion of said fluid barrier, conduit means extending through said housing for axially introducing a heavier fluid into the inlet portion of said fluid barrier and discharge means in said rotor housing for removing the heavier fluid after it has been peripherally discharged from said contact chamber, inlet means formed in said housing for peripherally supplying a lighter fluid to said contact chamber and outlet means formed in said housing for axially removing the lighter fluid after it has been discharged through said central axial outlet, means for rotating said rotor body to move the heavier fluid centrifugally and the lighter fluid centripetally through said contact chamber, baffle means disposed within the central axial region of said contact chamber for radially disbursing the heavier fluid and fluid contact means concentrically disposed within said contact chamber about said baffle means for radially receiving the centrifugally distributed heavier fluid.

26. Apparatus as in claim 1, said annular fluid distributing means comprising at least two pipes substantially parallel to the axis of rotation and having apertures for distributing said heavier fluid onto said fluid contact chamber.

No references cited.